UNITED STATES PATENT OFFICE.

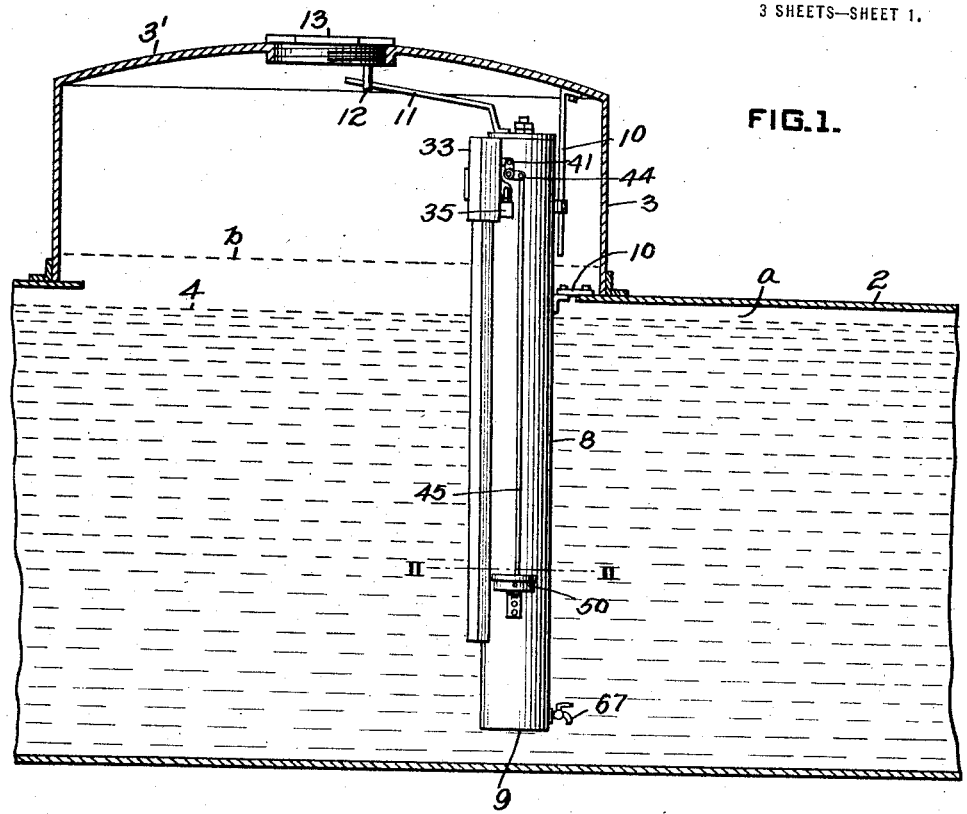
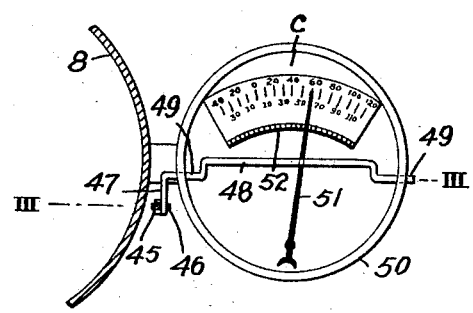
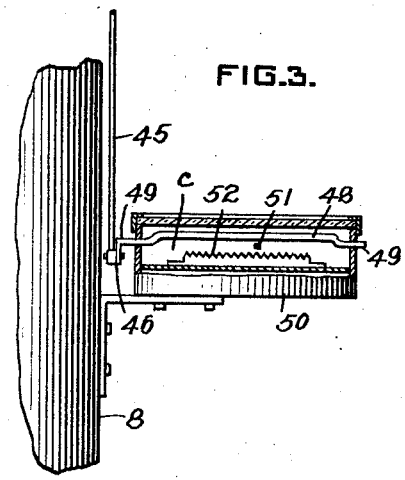

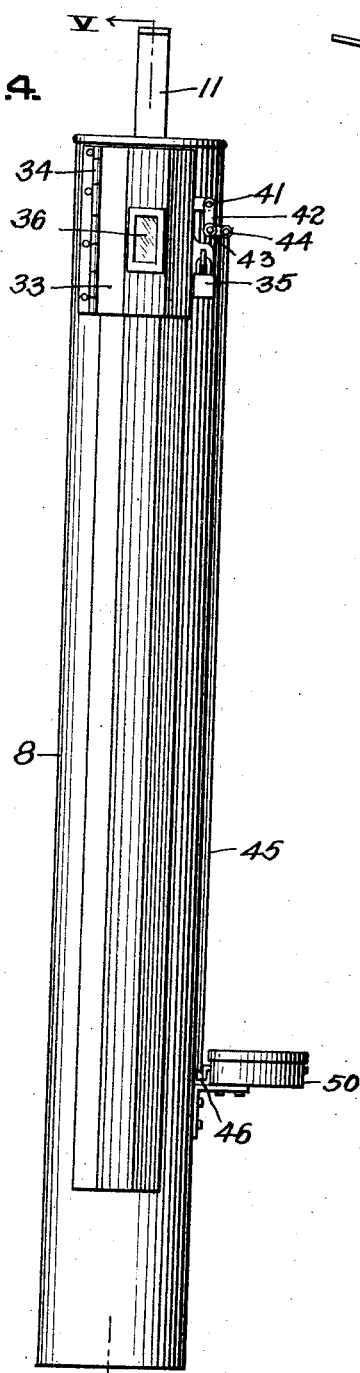
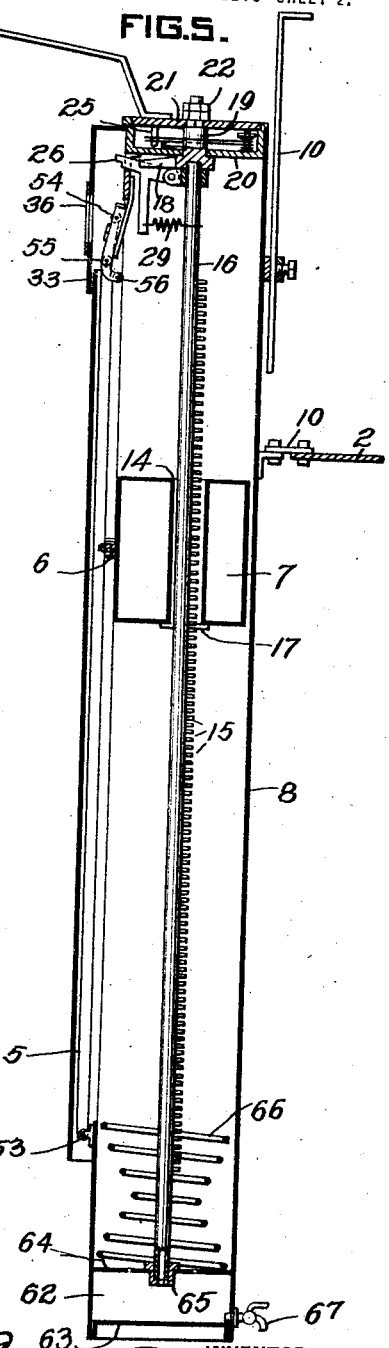

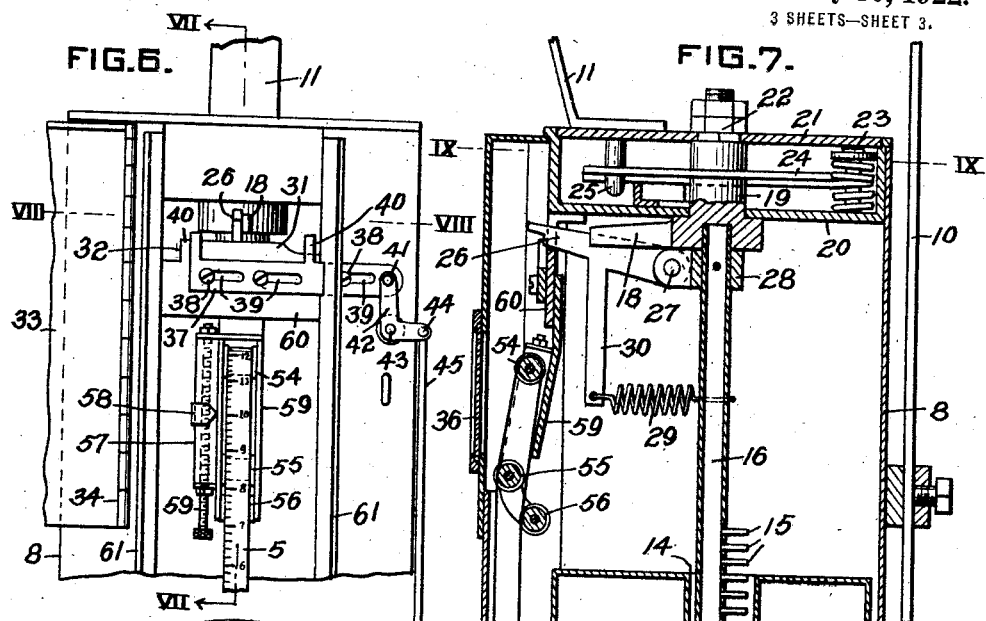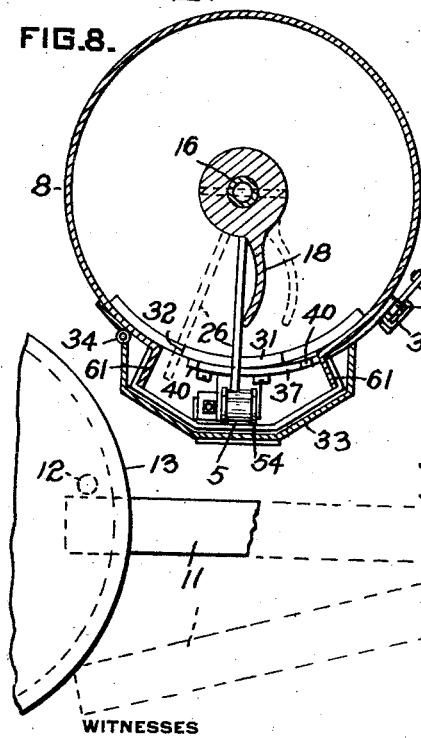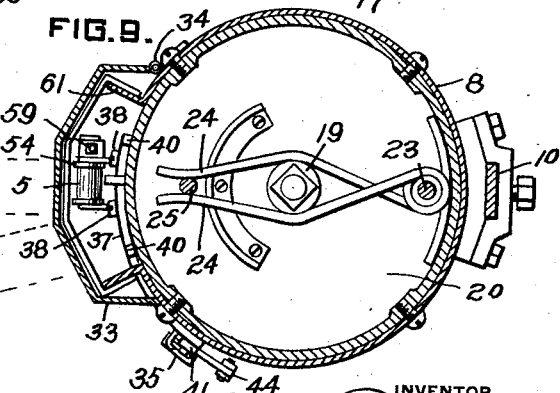

CHARLES F. EHRENTRAUT, OF PITTSBURGH, PENNSYLVANIA.

OUTAGE GAUGE.

1,417,892.   Specification of Letters Patent.   Patented May 30, 1922.

Application filed June 26, 1918, Serial No. 241,941. Renewed October 31, 1921. Serial No. 511,845.

*To all whom it may concern:*

Be it known that I, CHARLES F. EHRENTRAUT, a citizen of the United States, residing at Pittsburgh, in the county of Allegheny and State of Pennsylvania, have invented certain new and useful Improvements in Outage Gauges, of which the following is a specification.

My invention relates to improvements in means for indicating the level of the contents of a tank car or similar vessel, especially upon arriving at the shipping destination, whereby to avoid controversy as to the contents of the vessel when received by the consignee. It is particularly adapted to use in connection with tank cars or the like, used in the shipment of volatile liquids as gasoline, naphtha, and the like.

Ordinarily, in connection with the shipment of such liquids in the usual cylindrical tank cars provided with the ordinary dome, there occurs more or less shrinkage due to evaporation, leakage, etc., known as "outage." Under certain circumstances, there is also at times an apparent accretion of liquid, due to expansion, known as "domeage."

The invention comprises an indicating mechanism adapted to be located in the tank car, utilizing a float which assumes the level of the liquid when at rest at all times, and which is so arranged as to be positively fixed in position at the time that the cap of the dome is removed, when the contents are discharged. The float is freely mounted within a holding casing and provided with a coacting attached flexible scale, observable for reading at a predetermined point, so that when the float is arrested at or before the time of discharge of the contents, the scales will also be arrested and held, and will accurately indicate the level of the liquid at the time of arrival of the car at its destination, or when about to be emptied.

The device also embodies means for ascertaining and registering the temperature of the contents at the time of arrival or discharge and also for making a record of the gravity of the contents and for segregating a sample of the original contents.

The entire mechanism is so constructed as to be operable by the dome cap itself, upon unscrewing, and to be effectively locked in position, when so set, as to effectually prevent accidental release of the float. It is also preferably protected by a lock controlled closure which prevents unauthorized tampering by the consignee or others.

The present invention is an improvement in that class of devices disclosed in my prior application filed August 27, 1917, Serial No. 188,302.

One preferred embodiment of the present invention is illustrated in the accompanying drawings, in which:

Fig. 1 is a vertical longitudinal sectional view of a portion of a tank car showing the invention in position for use.

Fig. 2 is an enlarged sectional detail view indicated by the line II—II of Fig. 1 illustrating the registering thermometer mechanism.

Fig. 3 is a vertical sectional view indicated by the line III—III of Fig. 2.

Fig. 4 is a view of the device in elevation from the front at right angles to the position shown in Fig. 1.

Fig. 5 is a vertical sectional view therethrough indicated by the line V—V of Fig. 4.

Fig. 6 is an enlarged view in elevation of the upper portion of the outage gauge showing the cover thrown open exposing the shifting mechanism.

Fig. 7 is an elongated vertical sectional view therethrough on the line VII—VII of Fig. 6.

Fig. 8 is a cross sectional view on the line VIII—VIII of Fig. 6, the locking cover being closed.

Fig. 9 is a similar sectional view on the line IX—IX of Fig. 7.

In the drawings, 2 represents the main body portion or tank of an ordinary tank car provided with the usual dome 3. 4 represents the level of the liquid therein as it may be after shipment upon arriving at the point of destination, the space *a* indicating the "outage", i. e., the shrinkage in the liquid below the top portion of tank 2. "Domeage", i. e., any increase above such level, is indicated by the line *b*. Variations in either respect are indicated by a flexible tape gauge or measure 5 connected by a suitable clamp 6 to the rising and falling float 7 and operable to indicate the position of the float with relation to the main casing 8. The float 7 may be of any buoyant material as cork, or of an air tight sheet metal construction, as shown, which preferably is cylindrical in form and fits freely within the interior of the cylindrical casing.

As shown in Fig. 1, the casing 8 is located slightly above the bottom of the tank car, as indicated at 9, and may be fixedly secured in place by any convenient means as connections 10, 10. The casing 8 is of sufficient length to extend into the interior of the dome 3 adjacent its top, and is located toward one side of the dome as shown in Fig. 1, whereby to locate the actuating lever 11 of the mechanism within the path of the rotating pin 12 of dome cap 13. Said cap is ordinarily screwed into the central portion of the top 3' of dome 3, and the pin or abutment 12 is located eccentrically of its center, as shown.

Float 7 is centrally apertured vertically throughout its length providing an opening 14 which is preferably segmental in cross section, as clearly shown in my prior application above referred to, and providing for a range of lateral movement of the locking pins 15 of a pin shaft or stem 16.

Stem 16 is arranged for partial rotation under movement imparted by the dome cover 13, ineffectively when the door is screwed in place, but effectively, to arrest and lock the float, when it is unscrewed. The pins 15 extend laterally in alinement throughout the operative portion of the stem co-extensive with the range of movement of float 7, and are adapted to be thrust around laterally and to engage, in the limited space between adjacent pins, an arresting plate 17 at one or both ends of the float. Normally, pins 15 extend in a non-registering direction with relation to plate 17, so that float 7 is free to rise and fall within its casing, with the liquid contents of the tank car, except when stem 16 is thrust around by action of the dome cap in unscrewing to open the car, in the opposite direction to that indicated in dotted lines in Fig. 9. In such case the float is positively arrested and its position in the casing and the depth of contents of the car is indicated by the attached gauge 5.

Stem 16 is pivoted in any suitable step bearing 65 at its lower end and at its top is fixedly secured to a lever 18 having a hub and stem 19 which is rotatably mounted centrally of the top 20 of casing 8. In the upper portion of top 20 is a freely rotatable disk 21 fixedly connected with the upper end of stem 19 by nuts 22, so that as disk 21 is rotated in one direction or the other, corresponding movement will be imparted to stem 19 and lever 18.

Lever 11 is secured to disk 21 and extends into the path of abutment pin 12 which is secured to and extends downwardly from cover 13. As the cover is screwed into position in closing the dome, pin 12 engages against one side of lever 11 and throws it partially around inoperatively, as indicated in dotted lines, Fig. 9, the lever being returned to its normal middle position by action of springs 24, 24, extending from a holding pin 23 within the upper space of cover 20 and extending outwardly along each side of stem 19, whereby to engage a pin 25 which extends downwardly from cover 21. In such operation, lever arm 18 likewise is thrust backwardly and inoperatively as indicated in dotted lines, Fig. 8, during the operation of securing cover 13.

For the purpose of actuating the mechanism to arrest and fixedly hold the float upon unscrewing of the cover, a locking lever 26 is pivoted at 27 to a hub 28 fixedly secured on the upper end of stem 16, and lever 26 is normally held downwardly by action of spring 29 secured to arm 30 and stem 16 respectively, as shown in Fig. 7. The outer end of lever 26 rests upon the upper edge of a support 31 provided at one end with an arresting shoulder or abutment 32 providing a receiving recess for the terminal of the lever 26 when it is positively thrust around upon unscrewing of the cover, by reverse movement of lever 18, in which position the lever 26, by spring action, is drawn downwardly behind shoulder 32 and is held thereby until positively released by being lifted by the operator, upon access being had when the protecting coping or door 33 is opened.

In such arrested position, indicated in dotted lines in Fig. 8, stem 16 will have been rotated sufficiently far to engage plate 17 between the two adjacent registering pins 15, thus fixedly holding the float in position at the exact level of the liquid, as for instance, just prior to discharge of the contents of the car. For the purpose of preventing unauthorized access to the mechanism, the cover or coping 33 is provided, hinged at 34 at one side for being swung back, as in Fig. 6, and adapted to be locked in closed position by a suitable padlock or other convenient locking mechanism as indicated at 35. Said cover is provided with a sight aperture having a glass or other window 36 for observation and reading of the measuring tape or gauge 5, the position of which and the reading thereon is directly controlled by and always relative to the position of float 7 as hereinafter described.

Slidably mounted across the outer face of the curved plate 31, the upper edge of which forms a sliding support for lever 26, is a shift bar 37 secured by screws 38 engaging slots 39 and provided with upwardly extending abutments 40, 40, projecting slightly above the upper edge of plate 31. Slide bar 37 extends by one end sufficiently far to provide a pivotal connection 41 for bell crank lever 42 pivoted at 43 on the side of casing 8, and having pivotal engagement at 44 with the upper end of rod 45. Said rod extends downwardly along one side of the casing and is pivotally connected at 46 with the terminal lever 47 of locking rod 48. Said rod is offset throughout its middle portion beyond the normal pivoting center and is journaled on such center at 49, 49, in the case 50 of a thermometer c of well known construction.

The object of the lever connection and of locking door 48 is to thrust the indicating needle 51 of the thermometer downwardly into one of a series of notches 52 extending across the path of the needle so as to fixedly locate the needle in its indicating position, whereby to show the temperature of the contents of the car at the time that the bulk thereof is registered by the indicating gauge 5. The thermometer c, as shown in Fig. 1, is normally immersed in the liquid contents so that at the time of registering the volume thereof there is also a simultaneous registration of their temperature.

Slide bar 37 is positively retracted so as to release needle 51 by the action of screwing on cover 13 due to the backward thrust of lever 26 in its inoperative movement above described, the slide bar and its connected parts remaining in such retracted position until lever 26 is eventually thrust over in the opposite direction upon unscrewing the cover.

The steel tape gauge 5 passes around a roller 53 at the lower end of the casing, and around a similar roller 54 at its upper end, and also preferably around intermediate bearing rollers 55 and 56. The three uppermost rollers 54, 55 and 56 are arranged in the manner shown, whereby to provide a slight slope or incline of that portion of the indicating gauge which is observable through the window 36, and also provide for vertical arrangement of the inner and outer strands of the indicator between rollers 55 and 56 and lower roller 53, thereby facilitating the easy vertical travel of the gauge in connection with its attachment to float 7.

For the purpose of providing a terminal point with relation to which the reading on the gauge tape 5 may be made, and also for the purpose of providing for adjustment and computation, in connection with the amount of "outage" and with relation to the gravity of the contents, as gasoline, and whereby to permit of such adjustments so as to accommodate the device to the varying conditions due to the changes in temperature and the computations necessitated thereby, I provide a micrometer-gauge 57 having a pointer 58 and adjusting screw 59 suitably mounted, whereby to adjust pointer 58 to 0, or to any other desired position with relation to the reading of the tape gauge 5. The micrometer-gauge and bearing rollers 54, 55 and 56 are all conveniently mounted upon a supporting bracket 59 secured to a depending attachment 60 in the upper front portion of the device.

Cover 33 generally conforms to the outline of an outwardly spaced conduit 61, extending sufficiently far beyond the main cylindrical casing to provide ample space for housing the gauge tape and for covering and protecting it from damage or manipulation from the outside. When the cover is closed the working and registering portions of the device are completely protected from outside interference, and the device can only be adjusted for a new operation, as by lifting and allowing lever 26 to swing back to middle position under action of spring 24, by unlocking and opening the cover.

The device as thus constructed provides for extreme accuracy and the avoidance of any interference or accidental dislodgement; it is very compact and continuously serviceable in operation, and provides a completely connected mechanism for the purposes in view.

At the lower portion of the casing it is provided with an isolated chamber 62 located between a closing bottom 63 and an upper perforate diaphragm 64, in the center of which is provided the step box 65 for stem 16. Upwardly beyond partition or diaphragm 64 is a resilient spring 66 adapted to cushion the float 7 when it is dropped, after the contents of the tank have been emptied. Chamber 62 operates to collect a segregated sample of the main contents which is withdrawn through a cock or valve 67, thereby rendering it impossible to substitute contents of a different quality from those originally stored in the tank car without easy detection by comparison with such sample.

The advantages of the invention will be readily understood and appreciated by all those familiar with the custom of shipment of volatile liquids and the uncertainties and difficulties of accurately determining or agreeing upon the amount of loss or deterioration in shipment. It automatically and positively registers the level of the liquid so that substantially exact computation may be made of any variation in transit either in access or diminution, while also providing means for computing any apparent variation in actual contents due to changes in temperature, together with the various advantages incidental to its construction, operation and adaptation.

The invention may be changed or varied in design, construction or different details by the skilled mechanic, but all such changes are within the scope of the following claims.

What I claim is:

1. In combination with the rotatable float-holding stem of an outage gauge of the class described, a locking abutment, and a pivoted spring controlled arm secured to the stem and adapted to engage said shoulder.

2. An outage gauge having a thermometer, a float having a level-indicating device, and means for simultaneously locking the float and for registering the thermometer reading.

3. An outage gauge having a thermometer, a float having a level-indicating device, a device for engaging, arresting and holding the float, lever mechanism for actuating said device, and means operable thereby for effecting registration of the thermometer reading.

4. An outage gauge having a thermometer, a float having a level-indicating device, a device for engaging, arresting and holding the float, lever mechanism for actuating said device, a locking arm for the indicating hand of the thermometer, and a shifting device actuated by said lever mechanism connected with said locking arm.

5. An outage gauge provided with a freely movable float, an arresting device extending therethrough having a series of holding devices adapted to engage and fixedly hold the float upon rotation of said device, a temperature indicating device, means for rotatably actuating the arresting device, and means operable by the arresting device for locking the temperature indicating device.

6. An outage gauge provided with a casing having a bottom support provided with a spindle bearing, a partly rotatable stem seated therein provided with a series of holding devices, a freely movable float surrounding said stem and adapted to be engaged thereby, means for rotatably actuating said stem, and a spiral cushioning spring surrounding said stem and seated on the bottom support.

7. In an outage gauge, in combination, a casing provided at its bottom with a perforated cross plate having a spindle bearing, a partly rotatable spindle having a bearing therein and provided with a series of holding devices, a freely movable float surrounding said stem and adapted to be engaged thereby, means for rotatably actuating said stem, a spiral cushioning spring surrounding the stem and seated on the perforated cross plate, and a supporting bottom for the casing extending downwardly beyond the perforated cross plate.

8. In combination, a casing, a float therein, a vertically arranged stem adapted upon rotation to engage and arrest the float and provided with a locking arm, and a device adapted to move inoperatively in one direction and to operatively engage the locking arm in the other direction.

9. In combination, a casing, a float therein, a vertically arranged stem adapted upon rotation to engage and arrest the float provided with a pivoted locking arm, a rotatable device adapted to be actuated from means exterior of the casing and having a lever arm adapted to engage the locking arm in one direction to rotatively move the stem, and a holding shoulder for the locking arm.

10. In combination, a casing, a float therein, a vertically arranged stem adapted upon rotation to engage and arrest the float provided with a holding shoulder for the locking arm, and a spring for retracting said arm.

11. In combination, a casing, a float therein, a vertically arranged stem adapted upon rotation to engage and arrest the float provided with a pivoted locking arm, a rotatable device adapted to be actuated from means exterior of the casing and having a lever arm adapted to engage the locking arm in one direction to rotatively move the stem, a holding shoulder for the locking arm, and a shifting device actuated by the locking arm having connected therewith mechanism for locking a temperature indicating device.

12. An outage gauge having a vertically movable buoyant float, an arresting and holding device therefor, a flexible indicator connected with the float, guiding devices therefor, a supporting bracket for said guiding devices, and a co-acting indicator point relatively adjustable to the flexible indicator having an adjusting screw mounted on said bracket.

13. An outage gauge having a vertically movable bouyant float, an arresting and holding device therefor, a flexible indicator connected with the float, guiding devices therefor, a supporting bracket for said guiding devices, and a co-acting indicator point provided with means for adjusting it with relation to the reading on the flexible indicator incorporated with and forming a part of said bracket.

In testimony whereof I hereunto affix my signature.

CHARLES F. EHRENTRAUT.